United States Patent
Zigon et al.

(10) Patent No.: US 12,546,697 B2
(45) Date of Patent: Feb. 10, 2026

(54) ASYNCHRONOUS TRAINING FOR CLASSIFICATION IN FLOW CYTOMETRY

(71) Applicant: Beckman Coulter, Inc., Brea, CA (US)

(72) Inventors: Robert J. Zigon, Carmel, IN (US); Larry R. Myers, Greenfield, IN (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 19/101,872

(22) PCT Filed: Jun. 14, 2024

(86) PCT No.: PCT/US2024/034031
§ 371 (c)(1),
(2) Date: Feb. 6, 2025

(87) PCT Pub. No.: WO2024/263492
PCT Pub. Date: Dec. 26, 2024

(65) Prior Publication Data
US 2025/0258082 A1    Aug. 14, 2025

Related U.S. Application Data

(60) Provisional application No. 63/509,857, filed on Jun. 23, 2023.

(51) Int. Cl.
| | |
|---|---|
| *G01N 15/1429* | (2024.01) |
| *G01N 15/14* | (2006.01) |
| *G06N 20/10* | (2019.01) |

(52) U.S. Cl.
CPC ..... *G01N 15/1429* (2013.01); *G01N 15/1459* (2013.01); *G06N 20/10* (2019.01); *G01N 2015/1402* (2013.01)

(58) Field of Classification Search
CPC .......... G01N 15/1429; G01N 15/1459; G01N 2015/1402
See application file for complete search history.

(56) References Cited

U.S. PATENT DOCUMENTS

| | | |
|---|---|---|
| 7,672,792 B1 | 3/2010 | Cetto |
| 8,478,534 B2 | 7/2013 | Zhu |

(Continued)

FOREIGN PATENT DOCUMENTS

| | | |
|---|---|---|
| AU | 2020102379 A4 | 11/2020 |
| AU | 2020102877 A4 | 12/2020 |

(Continued)

OTHER PUBLICATIONS

PCT International Searching Authority, International Search Report and Written Opinion for International Application No. PCT/US2024/034031 mailed Sep. 12, 2024, 19 pages.

(Continued)

*Primary Examiner* — Ricky Go
(74) *Attorney, Agent, or Firm* — Merchant & Gould P.C.

(57) ABSTRACT

Systems, devices, and method for asynchronous training for classification of cellular subsets for flow cytometry. A training file is identified for training a classifier. A gate associated with the training file is received for training the classifier and a model for training the classifier is received. The classifier training begins and, concurrent with training of the classifier: flow cytometry files are classified and an accuracy of the classifier is monitored. A determination is made whether the gate should be adjusted based on the accuracy and a determination is made whether training of the classifier is complete.

16 Claims, 12 Drawing Sheets

(56) References Cited

U.S. PATENT DOCUMENTS

| | | | |
|---|---|---|---|
| 8,682,810 | B2 | 3/2014 | Zhang |
| 9,477,906 | B2 | 10/2016 | Roder |
| 10,217,620 | B2 | 2/2019 | Roder |
| 10,438,120 | B2 | 10/2019 | Simm |
| 10,601,902 | B2 | 3/2020 | Stadnisky |
| 11,056,236 | B2 | 7/2021 | Kumar |
| 11,289,318 | B2 | 3/2022 | Zhou |
| 11,416,704 | B2 | 8/2022 | Zare |
| 2009/0204557 | A1* | 8/2009 | Zhang ............... G06V 20/698 702/19 |
| 2012/0214190 | A1 | 8/2012 | Hou |
| 2020/0105376 | A1 | 4/2020 | Lai |
| 2021/0096054 | A1* | 4/2021 | Ko ................... G01N 15/14 |
| 2021/0102886 | A1 | 4/2021 | Monaghan |
| 2021/0278333 | A1* | 9/2021 | Irvine ................ G01N 15/1434 |
| 2022/0044765 | A1 | 2/2022 | Song |
| 2022/0076783 | A1 | 3/2022 | Cristescu |
| 2022/0260559 | A1 | 8/2022 | Blume |
| 2022/0334043 | A1 | 10/2022 | Kono |
| 2023/0003699 | A1 | 1/2023 | Lacout |
| 2023/0055572 | A1 | 2/2023 | Pickering |
| 2023/0215571 | A1* | 7/2023 | Wang ................ G01N 15/1459 702/19 |
| 2023/0393050 | A1* | 12/2023 | Krishnan ............. C12N 5/0612 |
| 2024/0362462 | A1* | 10/2024 | Nakayama ............ G06F 18/23 |

FOREIGN PATENT DOCUMENTS

| | | |
|---|---|---|
| CN | 105424560 A | 3/2016 |
| CN | 111814864 A | 10/2020 |
| CN | 112505133 A | 3/2021 |
| CN | 112885411 A | 6/2021 |
| CN | 113495094 A | 10/2021 |
| CN | 113792814 A | 12/2021 |
| CN | 113870181 A | 12/2021 |
| CN | 114018789 A | 2/2022 |
| CN | 114199989 A | 3/2022 |
| CN | 114333998 A | 4/2022 |
| CN | 114755357 A | 7/2022 |
| CN | 115176139 A | 10/2022 |
| CN | 115206422 A | 10/2022 |
| CN | 115510964 A | 12/2022 |
| EP | 2350808 B1 | 9/2019 |
| EP | 4097448 A1 | 12/2022 |
| JP | 2021174596 A | 11/2021 |
| KR | 2154335 B1 | 9/2020 |
| KR | 2268963 B1 | 6/2021 |
| KR | 2352444 B1 | 1/2022 |
| KR | 2022048290 A | 4/2022 |
| KR | 2494833 B1 | 2/2023 |
| KR | 2494834 B1 | 2/2023 |
| RU | 2638787 C1 | 12/2017 |
| TW | 202223921 A | 6/2022 |
| WO | 2021075826 A1 | 4/2021 |
| WO | 2021154579 A1 | 8/2021 |
| WO | 2021193673 A1 | 9/2021 |
| WO | 2021260159 A1 | 12/2021 |
| WO | 2022031737 A1 | 2/2022 |
| WO | 2022056478 A2 | 3/2022 |
| WO | 2022078633 A1 | 4/2022 |
| WO | 2022121055 A1 | 6/2022 |
| WO | 2022121973 A1 | 6/2022 |
| WO | 2022236411 A1 | 11/2022 |
| WO | 2023006714 A1 | 2/2023 |
| WO | 2023019093 A2 | 2/2023 |

OTHER PUBLICATIONS

Peng Qiu: "Computational prediction of manually gated rare cells in flow cytometry data", Cytometry A, Wiley-Liss, Hoboken, USA, vol. 87, No. 7, Mar. 9, 2015, pp. 594-602.

Eustasio Del Barrio et al: "optimalFlow: optimal transport approach to flow cytometry gating and population matching", BMC Bioinformatics, Biomed Central LTD, London, UK, vol. 21, No. 1, 27 Oct. 27, 2020, pp. 1-25.

Zeune Leonie L. et al: "Deep learning of circulating tumour cells", https://www.nature.com/articles/s42256-020-0153-x.pdf, Nature Machine Intelligence, vo 1 . 2 , No. 2, Feb. 1, 2020, pp. 124-133.

* cited by examiner

ASYNCHRONOUS TRAINING FOR CLASSIFICATION IN FLOW CYTOMETRY

CROSS-REFERENCE TO RELATED APPLICATION

This application is a U.S. National Stage Application of PCT International Patent Application No. PCT/US2024/034031, filed Jun. 14, 2024, which claims the benefit of and priority to U.S. Application No. 63/509,857, filed on Jun. 23, 2023, entitled ASYNCHRONOUS TRAINING FOR CLASSIFICATION IN FLOW CYTOMETRY, the disclosures of which are hereby incorporated by reference in their entireties. To the extent appropriate, a claim of priority is made to each of the above-disclosed applications.

BACKGROUND

Flow cytometry is a technique for detecting and analyzing chemical and physical characteristics of cells or particles in a fluid sample. For example, a flow cytometer may be used to assess cells from blood, bone marrow, tumors, or other body fluids. Particles are optically analyzed as they pass through a nozzle in single file to generate radiated light including forward scattered light, side scattered light, and fluorescent light. The radiated light can then be detected and analyzed to determine one or more characteristics of the particles.

In some types of flow cytometry, such as polychromatic and spectral flow, gates are used to classify cells or particles into subsets. These gates are commonly geometric objects like circles, ellipses, squares, rectangles, and arbitrary n-sided polygons. This notion of creating a geometric gate to classify cells has been present in flow cytometry since its inception and traditionally involves a user drawing the geometric figure by which the classifications are defined. A particle is either inside the gate or it is not.

SUMMARY

Examples presented herein relate to a method of asynchronous training for classification of cellular subsets for flow cytometry. The method includes identifying a training file for training a classifier; receiving a gate associated with the training file for training the classifier; receiving a model for training the classifier; training the classifier and, concurrent with training of the classifier; classifying one or more flow cytometry files; monitoring an accuracy of the classifier; making a determination whether the gate should be adjusted based on the accuracy; and determining training of the classifier is complete.

In other aspects presented herein, the method further includes displaying a result of classifying of the one or more flow cytometry files. In yet other examples presented herein, the method further includes the result showing changes as the classifying of the one or more flow cytometry files changes in response to the training of the classifier continuing. In still other implementations presented herein, the determination whether the gate should be moved based on the accuracy comprises determining a movement that should be applied to the gate. In other examples presented herein, the method further includes moving the gate in response to determining the movement that should be applied to the gate.

In still other aspects presented herein, the method further includes making a determination to train an additional classifier. In other implementations presented herein, the determination to train the additional classifier is in response to receiving a selection of the additional classifier. In yet other aspects presented herein, the method further includes training the additional classifier. In other embodiments presented herein, the method further includes making a determination that one or more statistics should be added to the model. In still other examples presented herein, the method further includes making a determination that a compensation of the model should be changed.

In other aspects presented herein, the training file comprises a set of Flow Cytometry Standard (FCS) files. In other aspects presented herein, the gate selection is a geometric gate. In other aspects presented herein, the gate selection is a two-dimensional gate. In yet other aspects presented herein, the classifier infers one or more additional dimensions beyond the two-dimensional gate. In further examples presented herein, the classifier generates a function based on the geometric gate.

Other examples presented herein relate to a system for asynchronous training for classification of cellular subsets for flow cytometry. The system includes one or more processors; a memory including instructions which, when executed by the one or more processors, cause the system to generate a classifier. The classifier is configured to: receive a training file, a gate associated with the training file, and a model; begin training based on the training file, the gate, and the model; and concurrent with training, classify one or more flow cytometry files.

In other aspects presented herein, the system further includes a display, wherein a result of classifying the one or flow cytometry files is displayed. In further aspects presented herein, the result is a dynamic display, such that a change to the result due to continued training of the classifier is depicted on the display. In other aspects presented herein, the change is depicted in real time.

Other aspects presented herein relate to a system for classification of cellular subsets for flow cytometry. The system includes a flow cytometer; a gating module in communication with the flow cytometer and including: a classifier including a model; a training file used by the classifier to train the model; and a display module displaying a result of a classification of a flow cytometry file by the classifier, wherein the result is displayed concurrent with training of the classifier.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
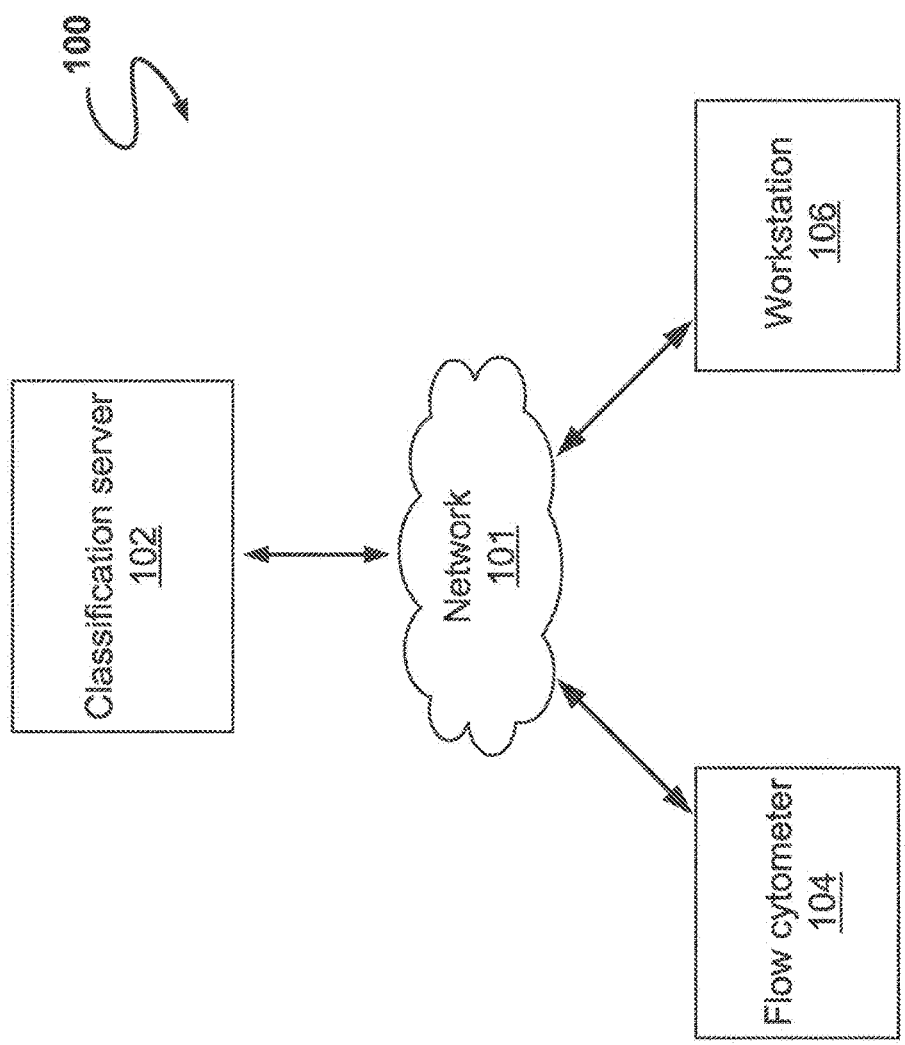
FIG. 1 illustrates an example operational environment in which aspects of the present disclosure may be implemented.

Reference will now be made in detail to exemplary aspects of the present disclosure that are illustrated in the accompanying drawings. Wherever possible, the same reference numbers will be used throughout the drawings to refer to the same or like parts.

Traditional, manual gating in flow cytometry suffers from a lack of reproducibility. Two researchers can look at the same set of plots and draw the gates differently. Since the populations (defined by the two researchers) are different, any statistics associated with those populations will also vary.

As described herein, machine learning (ML) may be implemented to solve the reproducibility problem of traditional manual gating. At a high level, existing flow cytometry data is used to build a function that will generate the classification for a given cell. For example, a first function is trained to generate a binary classifier with a class name like "monocyte" or "not monocyte," while second function generates a binary classifier with class names like "lymphocyte" or "not lymphocyte," each for a given event in a flow cytometry plot. The constituent data for an event could consist of the Area (A), Height (H) or Width (W) values generally found in flow cytometry products. In embodiments where an output waveform were available for each event (e.g., supplied by an avalanche photodiode or photomultiplier tub configured to provide complete waveform output), then the functions may also accept the waveform for input. The data driven approach as disclosed herein enables the removal of human variability from the classification, or gating, process as presently implemented.

However, machine learning introduces limitations of its own into the gating process. Machine learning systems typically progress in two distinct phases. First, there is a training phase and then there is an inferring phase. Inferencing is the process of using a trained function to generate a classifier. Inferencing can generally proceed to compute the classifier on the order of about 10 milliseconds. The training phase, on the other hand, can take minutes, hours, or even days to compute based on the complexity of the underlying model.

While in some cases users are able to tolerate long training times, such delays can be limiting or prohibitive to application in many instances. In particular, cases which call for setting training parameters or require retraining as part of an analysis may be precluded from effective use of machine learning classification due to time limitations.

Disclosed herein is an approach to machine learning training that is asynchronous with the other analysis activities a user performs in a flow cytometry analysis. This provides the user with use of a classification function moments after defining it by enabling the training as a non-blocking activity. The training does not have to finish before the user can proceed with other analysis activities. While training of the classification function proceeds in the background, events in the protocol are classified. That classification can improve with time. The system may be further configured to provide instantaneous feedback regarding the quality of the classifier. The feedback may enable further optimization of the time a researcher or clinician spends interacting with the data set as the user can readily evaluate the reliability of the classifications.

Referring now to FIG. 1, an example network environment 100 in which aspects of the present disclosure may be implemented is illustrated. In particular, the environment 100 may be used to provide one or more analytical tools to a user for purposes of assisting with gating and other classifications of flow cytometry protocol outputs. The analytical tools may include machine learning based gating with asynchronous training as discussed in more detail below.

Environment 100 includes a classification server 102, a flow cytometer 104, a workstation 106, and a network 101. In the example environment 100, classification server 102 is communicatively connected to flow cytometer 104 and/or workstation 106 via a network 101, such as the Internet or a secure local network.

Classification server 102 may provide a repository of data and programming for execution of gating and other analysis programs. Either or both of classification server 102 and workstation 106 may host one or more analysis programs, such as machine learning models and/or gating or classification analysis programs, which may use particle analysis data taken by flow cytometer 104 or stored in classification server 102 for purposes of analysis and prediction. One or more users, such as via workstation 106 or an external user device, may access one or more analytic tools provided, such as by the classification server 102, for example to determine a desired set of gates for a particular set of flow cytometry output data. Classification server 102 is discussed in more detail below with respect to FIG. 3.

Flow cytometer 104 analyzes samples for classification. Flow cytometer 104 is discussed in more detail below with respect to FIG. 2.

Workstation 106 provides for data output from classification server 102 and flow cytometer 104. Workstation 106 enables user interaction with the environment 100 and may provide for user control of system components. Workstation 106 may include, for example, a display device and one or more input devices.

Figure 2:
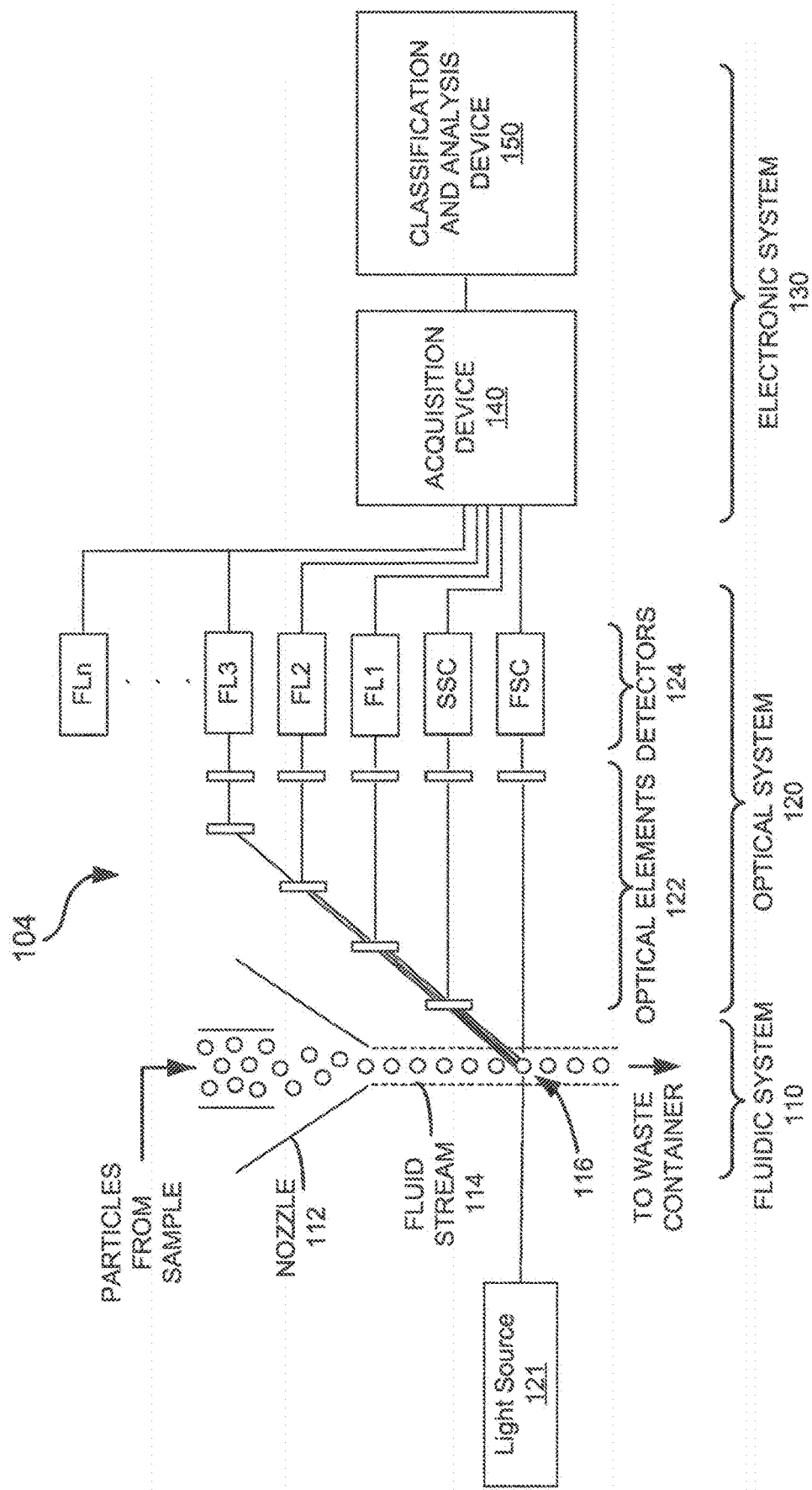
FIG. 2 illustrates an example flow cytometry system in which aspects of the present disclosure may be implemented.

Referring now to FIG. 2, an example of a flow cytometer system 104 is illustrated. In general, flow cytometry is a technique for measuring and analyzing properties of particles or cells when flowing in a fluid stream. Data from millions of particles or cells can be collected by the flow cytometer system 104 in a matter of minutes and displayed in a variety of formats. Illustrative example applications of flow cytometry include phenotyping to identify and count specific cell types within a population, analyzing DNA or RNA content within cells, determining presence of antigens on a surface or within cells, and assessing cell health status.

As shown in the illustrative example of FIG. 2, the flow cytometer system 104 generally includes three main component subsystems: a fluidic system 110, an optical system 120, and an electronic system 130. The fluidic system 110 includes a nozzle 112 which receives a sample containing particles or cells suspended in a fluid. The nozzle 112 creates and ejects a fluid stream 114 of the particles or cells arranged in a single file line. Each particle or cell passes through one or more beams of light produced by a light source 121. The point at which a particle or cell intersects with a light beam is known as an interrogation zone 116. In some examples, the light source 121 includes one or more lasers.

The optical system 120 includes the light source 121, optical elements 122, and detectors 124. At the interrogation zone 116, light from the light source 121 hits a particle or cell in the fluid stream 114 and scatters. The optical elements 122 direct the scattered light toward the detectors 124. The detectors 124 can include a forward scatter (FSC) detector to measure scatter in the path of the light source 121, a side scatter (SSC) detector to measure scatter at a ninety-degree angle relative to the light source 121, and one or more fluorescence detectors (FL1, FL2, FL3 . . . FLn) to measure the emitted fluorescence intensity at different wavelengths of light.

Generally, FSC intensity is proportional to the size or diameter of a particle due to light diffraction around the particle. FSC may therefore be used for the discrimination of particles by size. SSC, on the other hand, is produced from light refracted or reflected by internal structures of the particle and may therefore provide information about the internal complexity or granularity of the particle. By adding fluorescent labelling to a sample, different fluorescent signals/channels (e.g., green, orange, and red) can be analyzed for functional characteristics of a cell. For example, since T-cells present CD3 binding sites, a sample containing T-cells may be "stained" with anti-CD3 antibodies conjugated with a fluorescent molecule. As these cells pass through the interrogation zone 116, the light from the source light excites the fluorescent tag, or fluorochrome, to emit photons at a wavelength detectable by a fluorescence detector. The detectors 124 may therefore simultaneously measure several parameters and enable categorization of particles by their function based on detected wavelengths of light.

The electronic system 130 includes an acquisition device 140 and a classification and analysis device 150. The acquisition device 140 is communicatively coupled with the detectors 124 to receive optical data generated by the detectors 124. The classification and analysis device 150 is configured to receive the optical data and display it for a user of the flow cytometer system 104, such as at workstation 106 or user device 108 of FIG. 1. In some embodiments, the classification and analysis device 150 comprises a computing device communicatively coupled with a flow cytometer 104, such as over a network, such as example network 101 of FIG. 1. The flow cytometer 104 may include the fluidic system 110, optical system 120, and acquisition device 140. In other embodiments, the classification and analysis device 150 is integrated with the flow cytometer 104. In embodiments, classification and analysis device 150 may be a virtual device hosted remotely from flow cytometer 104, such as on classification server 102 of FIG. 1.

Figure 3:
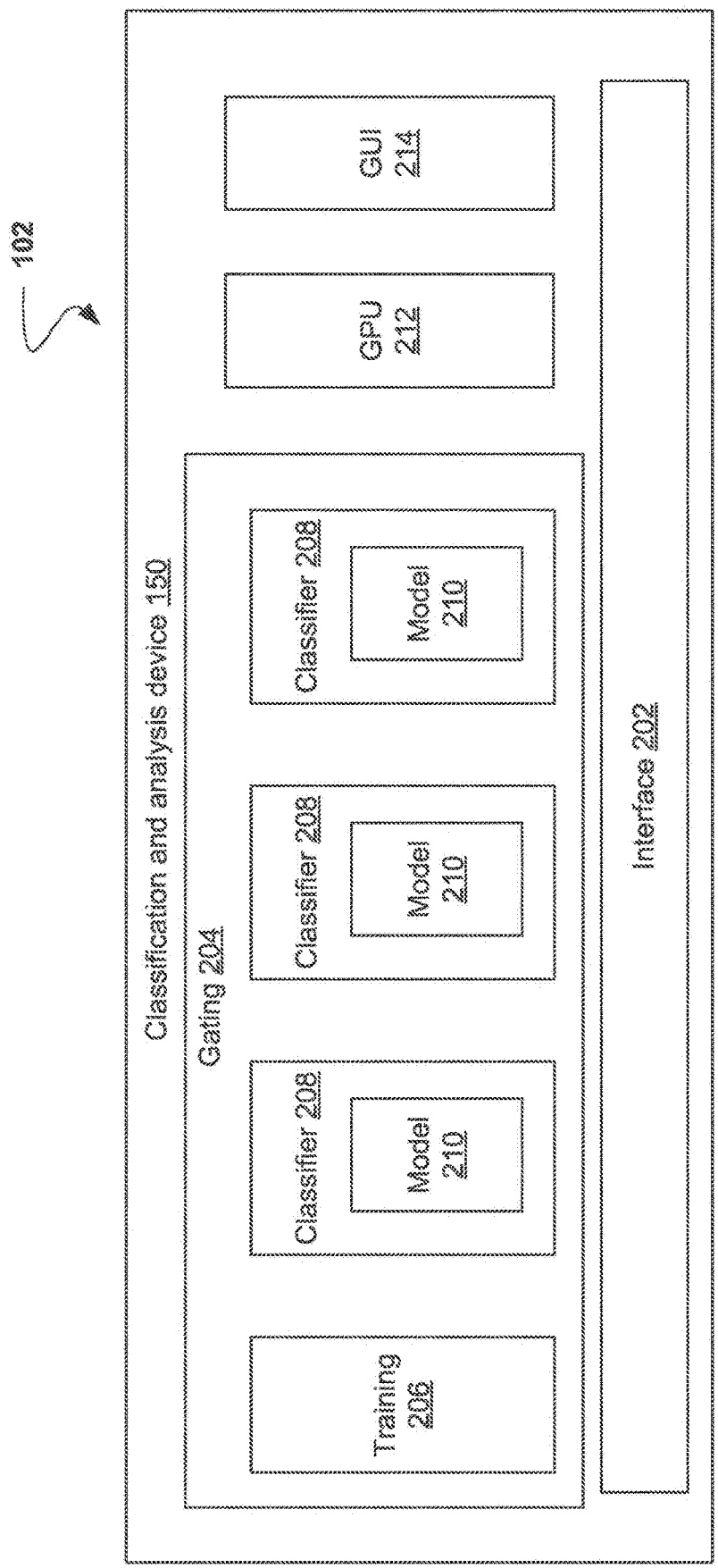
FIG. 3 illustrates an example classification and analysis device in which aspects of the present disclosure may be implemented.

FIG. 3 illustrates is an example classification and analysis device 150. Classification and analysis device 150 receives, processes, and displays optical data from flow cytometer 104 via acquisition device 140. Classification and analysis device may include an interface 202 facing acquisition device 140 to receive optical data from flow cytometry system 104. Classification and analysis device 150 may further include a gating module 204, training dataset 206, one or more classifiers 208, one or more models 210, a graphics processing unit (GPU) 212, and a graphical user interface (GUI) 214.

Gating module 204 includes components for analyzing flow cytometry sample datasets and classifying subsets of cells or particles in those datasets. Training dataset 206 provides a repository of known flow cytometry data which may be used to train classifiers 208 and models 210. In supervised learning, the data in the training dataset 206 may be labeled by a user. In unsupervised learning, the data in the training dataset 206 may be labeled according to patterns identified by the system. Files or file sets in training dataset 206 may be flow cytometry standard (FCS) files. Classifiers 208 assign class labels to sample data received from a flow cytometer. Each classifier 208 includes at least one model 210. Models 210 are programs or algorithms programmed or otherwise configured to find patterns and make determinations from raw or otherwise unseen data.

GPU 212 generates graphics outputs to make the output of gating module 204 accessible to a user. GPU 212 may generate an interactive user output, such as GUI 214. GUI 214 provides visual output data and receives user input to enable a user to interact with classification and analysis device 150. Classification and analysis device 150 may execute on one or more processors to provide the functionality described herein in conjunction with the GPU 212 such as receiving user input via the GUI 214. In some embodiments, GPU 212 and GUI 214 may be combined and provided by a single component, such as a display module.

In some implementations, GPU 212 is used to perform the classification during the training and inferencing process.

One or more components of the classification and analysis device 150 may reside in a cloud computing application in a network distributed system, such as across network 101. In that regard, the classification and analysis device 150 may be any of a variety of computing devices, including, but not limited to, a personal computing device, a server computing device, or a distributed computing device. In some examples, classification and analysis module 150 may further include a storage, such as a persistent storage, such as random-access memory (RAM) and/or long-term-non-volatile memory such as a hard drive.

Figure 4:
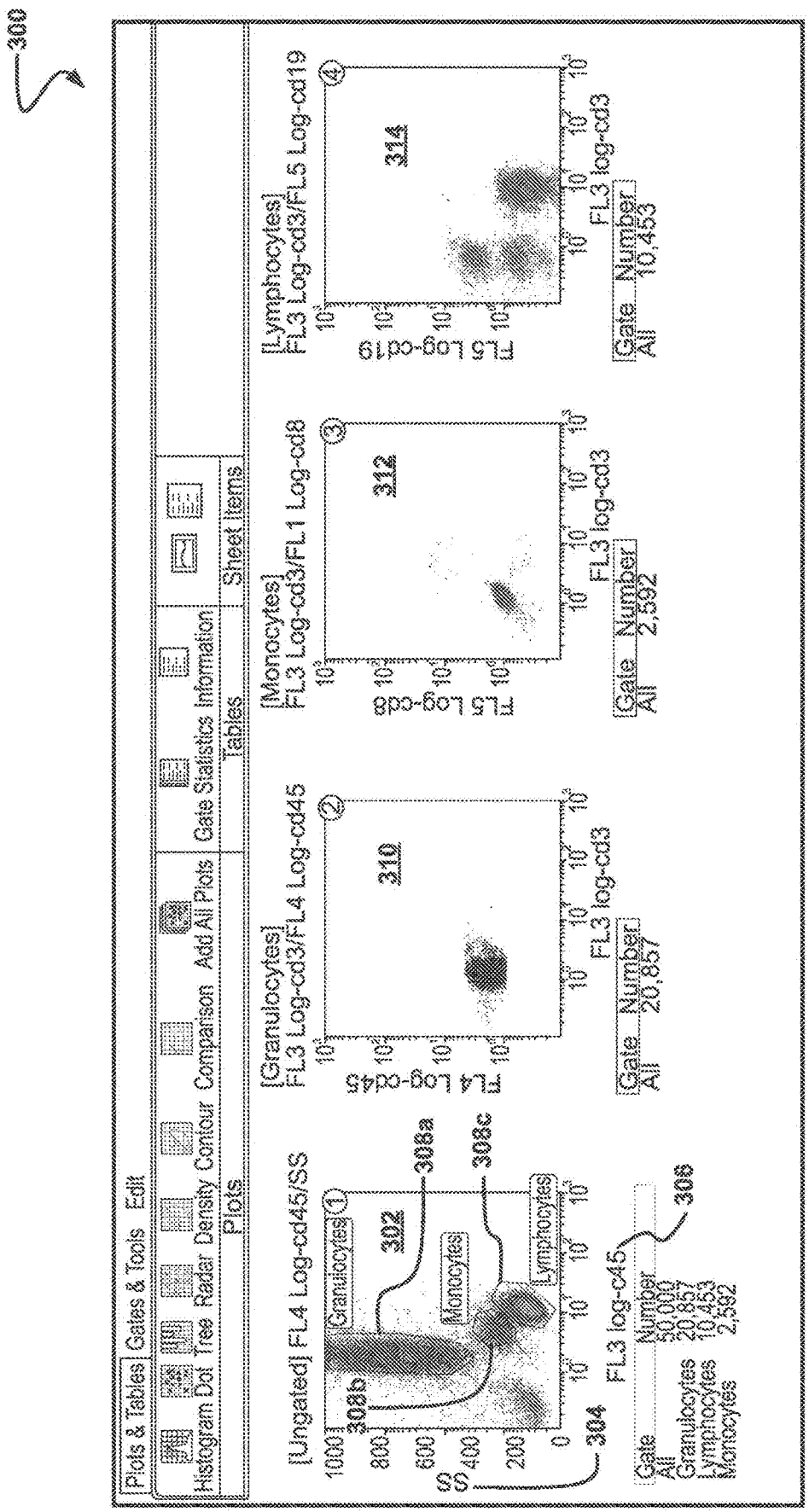
FIG. 4 illustrates an example graphical user interface (GUI) showing a portion of a flow cytometry analysis application according to aspects of the present disclosure.

FIG. 4 illustrates an example GUI 300 showing a portion of a flow cytometry analysis application according to aspects of the present disclosure. A first plot 302 shows all of the event data of a particular output file from flow cytometer 104. A side scatter (SS) parameter is shown on a Y axis 304, and a CD45 parameter is on an X axis 306.

The example plot 302 presents data based on a protocol run using a blood sample. The lymphocyte, monocyte and granulocyte populations within the sample have been identified with polygonal gates 308a-c. Each of these subpopulations may then be presented in additional detail plots 310, 312, and 314. For example, the input to plot 310 is the granulocyte population from gate 308a, the input to plot 312 is the monocyte population from gate 308b, and the lymphoctyes from gate 308c are displayed in plot 314.

Figure 5:
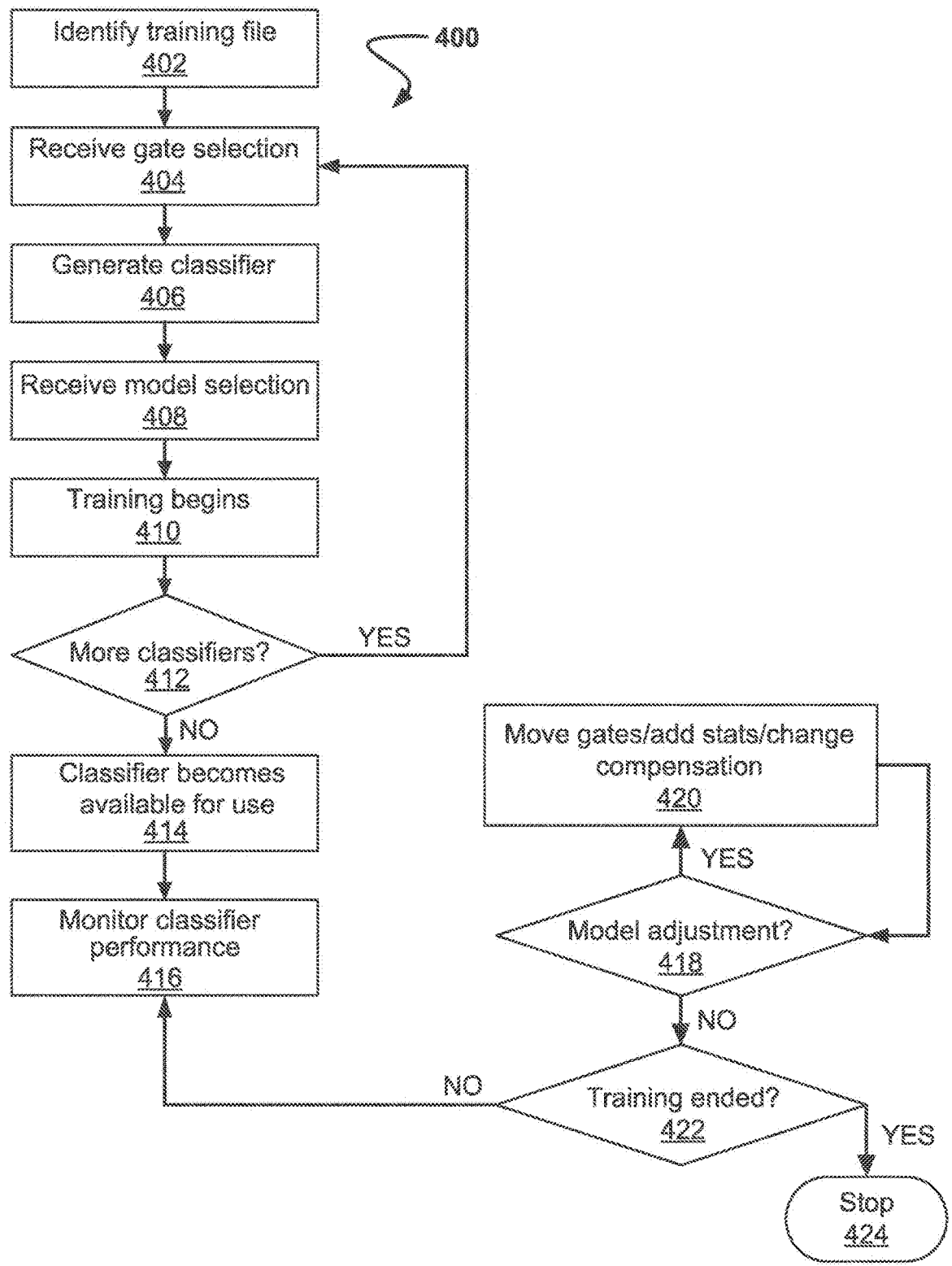
FIG. 5 illustrates an example method for asynchronous training of a cellular subset classifier according to aspects of the present disclosure.

FIG. 5 illustrates an example method 400 for asynchronous training of a cellular subset classifier according to aspects of the present disclosure. Method 400 may be implemented on or, in some embodiments, by a classification and analysis device, such as classification and analysis device 150 of FIG. 3. Method 400 permits training to proceed asynchronous with the rest of the application to maintain application responsiveness.

At operation 402, a file or a set of files that contain training data are identified. Training files may be selected by a user or identified by the system. Training files may be prepopulated training files or may be uploaded by a user or retrieved by the system as part of identifying the training file or set of training files.

Figure 6:
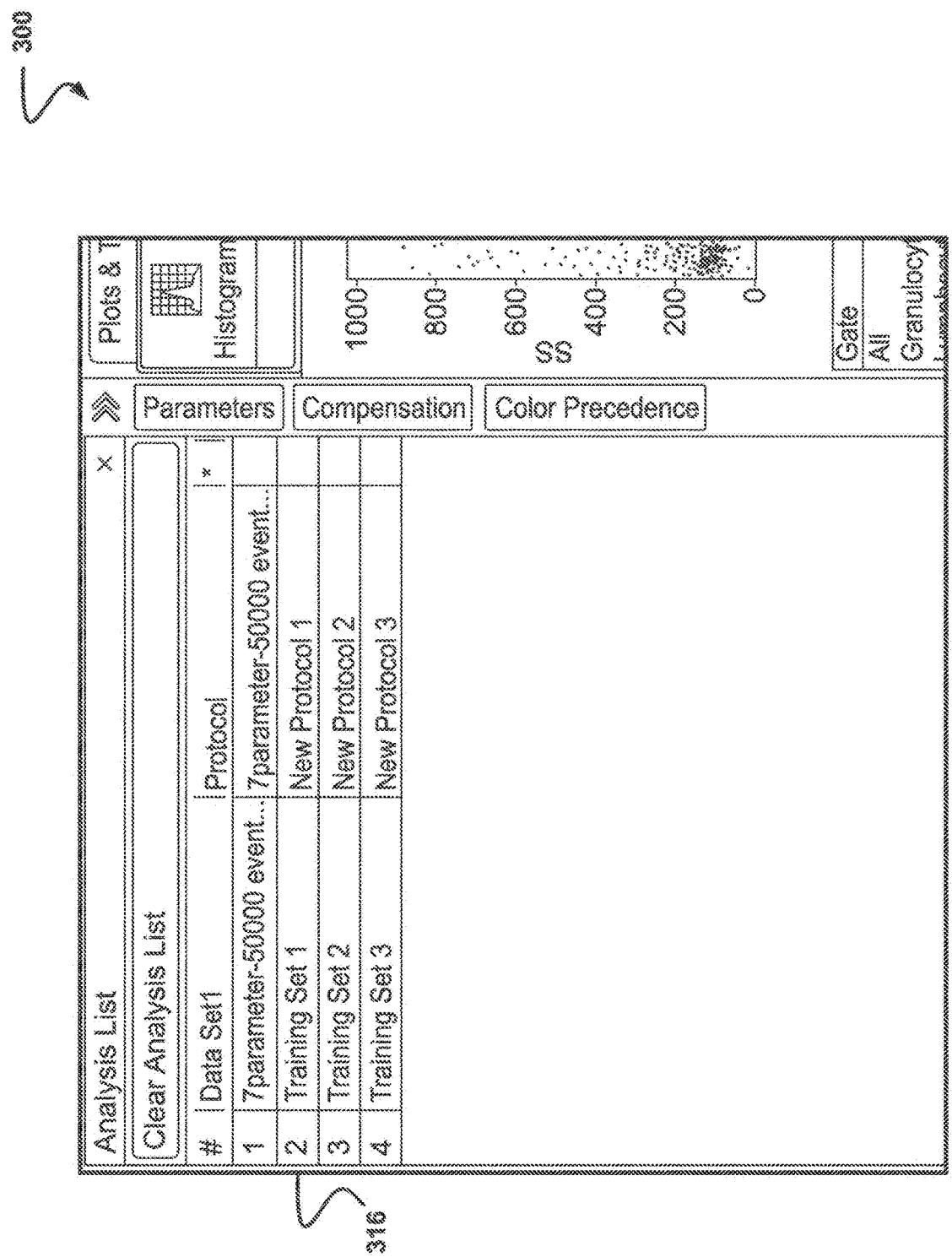
FIG. 6 illustrates an example of a training files worklist within the GUI of FIG. 4 according to aspects of the present disclosure.

FIG. 6 illustrates an example of a training files worklist 316 within the GUI 300 of FIG. 4. Training files worklist 316 may include one or more training files. Each training file may include one or more events. Each constituent data contributing to an event could consist of area, height, and width values as output by a flow cytometer, such as flow cytometer 104. In some embodiments, such as if an avalanche photodiode output of a full waveform were available for each event, then the training files may include waveform data.

At operation 404, one or more gates are defined or selected within the training file. In some embodiments, supervised training may be preferred and gate selection may be received in the form of user input. For example, in one or more selected training files, a user selects a gate for the system to use to train a classifier. Gates may be defined as geometric objects like circles, ellipses, squares, rectangles, and n-sided polygons, as some non-limiting examples. The contents of the geometric gates is used by the system to establish a ground truth. Although, in some embodiments, the user defines a two-dimensional gate, the input to the training procedure can potentially consist of all n-dimensions available in the events.

Figure 7:
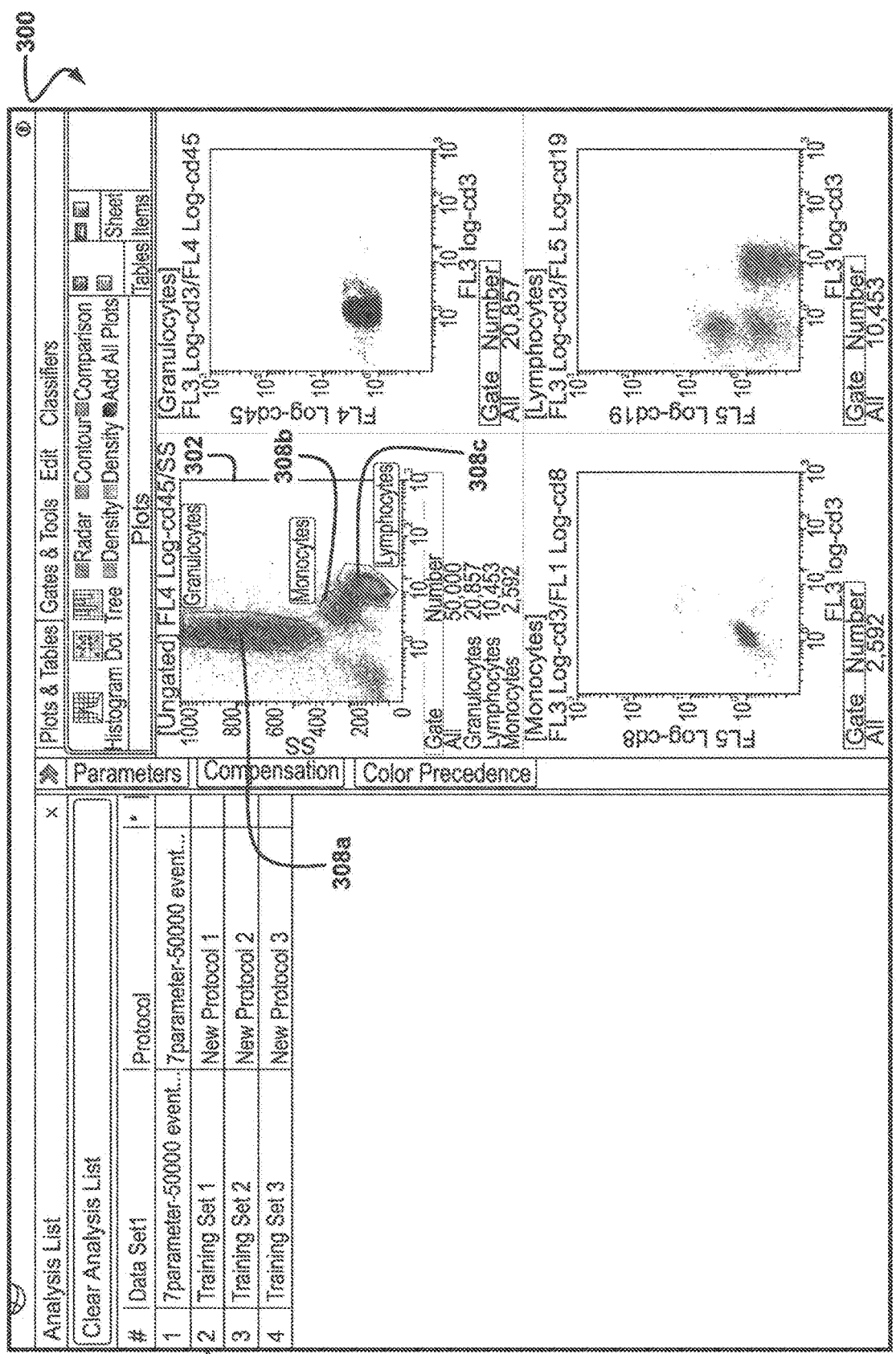
FIG. 7 illustrates a plot depicting example gates in the GUI of FIG. 4 according to aspects of the present disclosure.

At operation 406, a classifier is generated. The classifier may be generated automatically in response to receiving the gate selection. The classifier may be a binary classifier. In some embodiments, the system creates a classifier with the same name as the training gate. A gate with the same name may be present in all the training files such that a common classifier can apply identified gates from each training file. For example, FIG. 7 illustrates the CD45-SS plot 302 depicting the example gates 308 which may be applied to a training data file or file set from worklist 316 to train a classifier. The three gates represent the classes the user wishes to be generated. For example, gate 308a is "granulocytes" and may be used to generate a binary classifier with a first class of "granulocytes" and a second class of "not granulocytes."

At operation 408, a model is selected. In some embodiments, a model selection may be received from a user. In some embodiments, model selection may be determined automatically by the system along with classifier generation. Models may include any known or appropriate machine learning models or algorithms include, as some non-limiting examples, a support vector machine (SVM), a neural network (NN) such as a deep learning NN, vector quantization such as k-means clustering, non-parametric learning algorithms such as a decision tree, and generative learning algorithm such as a Naïve Bayes classifier.

Figure 8:
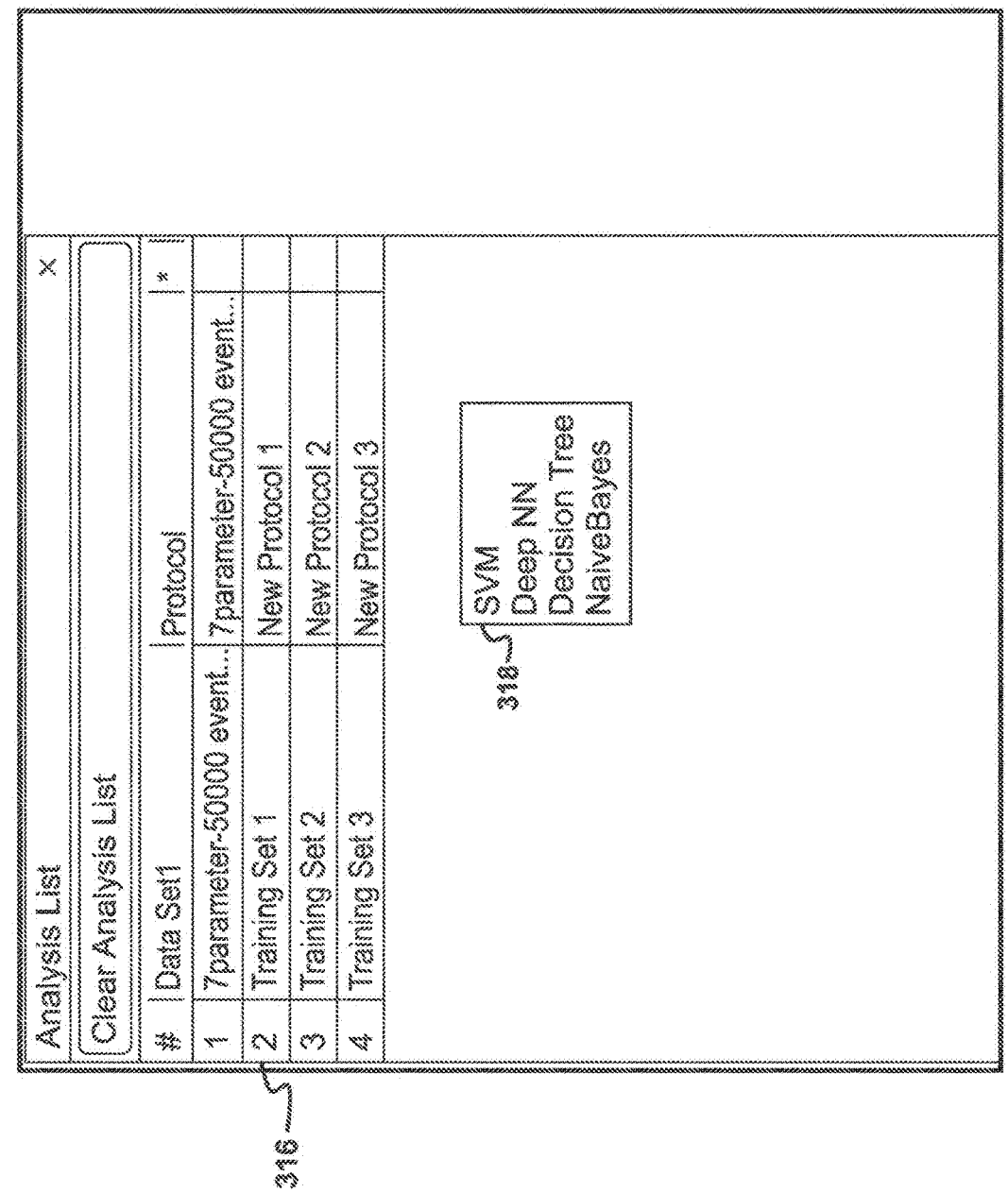
FIG. 8 illustrates an example of a user prompt to select a model in the GUI of FIG. 4 according to aspects of the present disclosure.

In some examples, a user may be prompted to select a model following gate entry or identification of the training file. FIG. 8 illustrates such an example. Three files have been selected from worklist 316 to supply training data and now a prompt to select a model from the pop up menu 318 appears. For example, when the user selects the training files, they may right click for a pop up menu. This menu will have the models on it. The user selects a model from the list. If additional parameters are required for the classifier, a popup dialog may be displayed for the user to configure the classifier. In some embodiments, reasonable defaults are provided for all required and optional parameters.

At operation 410, training begins. The generated classifier includes the selected model is trained according to the selected gates in the identified training file. During training, a classifier function is generated based on the selected gate. The selected gate may generally be a geometric gate. Using the function, the classifier may infer one or more additional dimensions for the classification, beyond the dimensions defined in the selected gate. e.g., two dimensions.

At operation 412, a determination is made whether additional classifiers are to be trained. For example, three gates 308a, 308b, and 308c are identified in the training data as illustrated in FIG. 7. In an embodiment training binary classifiers, each gate 308a, 308b, and 308c calls for an individual classifier. In this example, the system may begin with gate 308a and begin training a first classifier for gate 308a at operation 410 and, at operation 412, a determination is made that an additional classifier is needed, as classifiers still need to be trained according to gates 308b and 308c.

The system returns to operation 404 to receive or, if the next gate has already been received, to retrieve a next gate. e.g., gate 308b, to train. Then, according to gate 308b, a classifier is generated, at operation 406, a model selection is received, at operation 408, and training of classifier for gate 308b begins, at operation 410. In some embodiments, model selection, at operation 408, may be automated. For example, if multiple gate selections are received, at operation 404, as the system iterates through generating and training the classifier for each gate, a common model selection may be carried through such that each classifier is trained with a same model but a different gate. In some embodiments, different models may be selected for each gate, or multiple models may be selected for a particular classifier, such that an ensemble classifier may be trained for a given gate.

Once training begins for the classifier for gate 308b, the system may again determine, at operation 412, that additional classifiers are to be generated, e.g., a classifier for gate 308c. Once all classifiers have been generated, a determination may be made, at operation 412, that no additional classifiers are to be generated.

Figure 9:
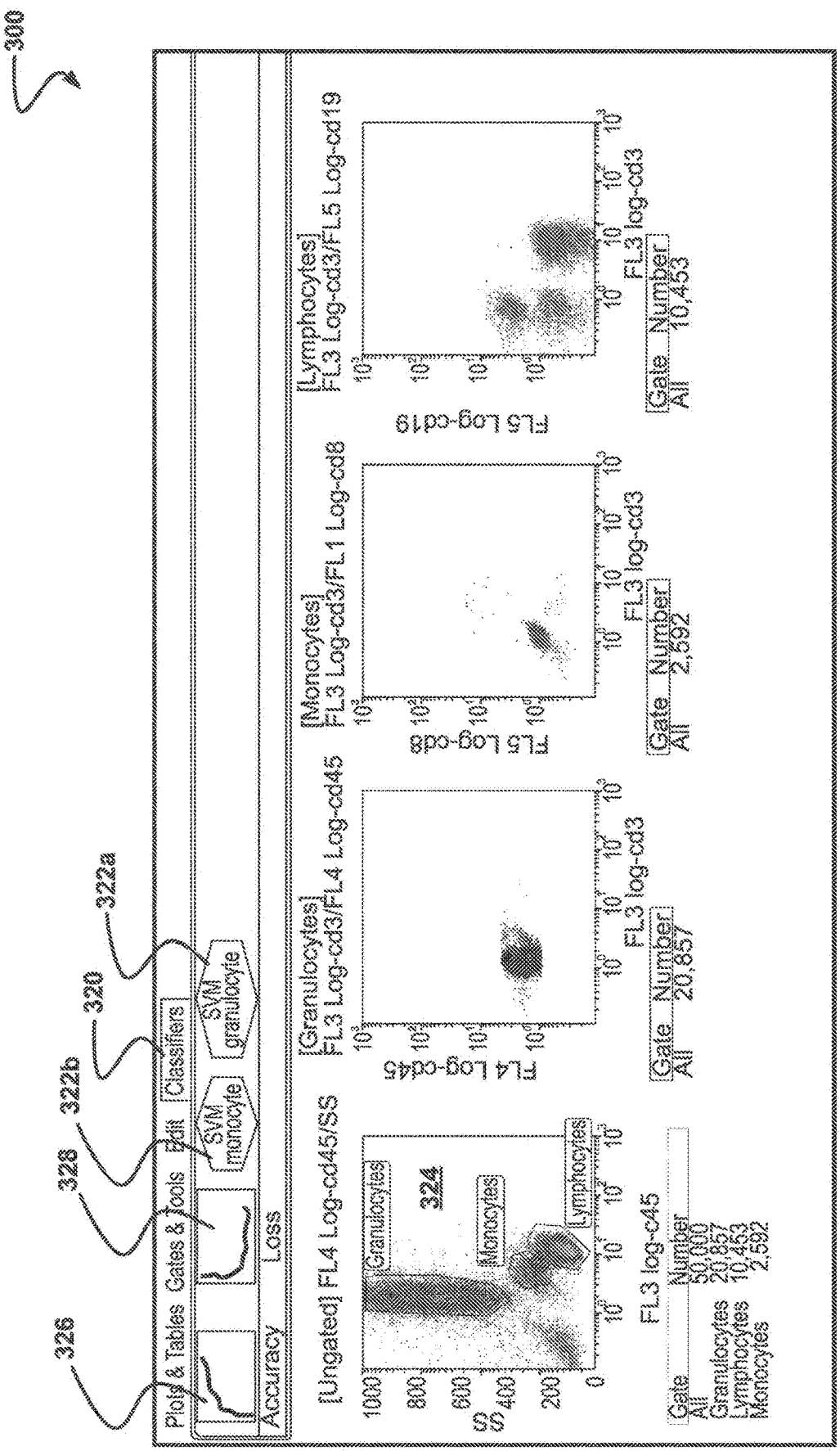
FIG. 9 illustrates a classifier tab showing currently defined classifiers the GUI of FIG. 4 according to aspects of the present disclosure.

At operation 414, the classifiers become available for use while training continues. FIG. 9 illustrates a classifier tab 320 showing currently defined classifiers the GUI 300 according to aspects of the present disclosure. For example, a user may click on classifiers tab 320 and sees the classifiers 322a, 322b that have been generated or are in the process of being generated. For example, if a classifier (such as granulocyte classifier 322a or monocyte classifier 322b) was selected, then loss graph 328 and accuracy graph 326 display the real time progress of that classifier with continual or periodic updates as training progresses.

The user may press a classifier, such as SVM monocyte 322b (corresponding to gate 318b) or SVM granulocyte 322a (corresponding to gate 318a), and it is instantly applied to all of the data in a protocol 324. Once a training of a classifier begins, it becomes available for use. Classifier can therefore be put to use classifying sample data while training progresses concurrently in the background.

As can be seen in the example of FIG. 9, classifiers 322 may become available as they are generated, such that some classifiers become available while additional classifiers are still being generated. Following from the example above, classifiers 322a and 322b, corresponding to gates 318a and 318b, have come available while a third classifier, corresponding to gate 318c, is still being generated.

At operation 416, the performance of the classifiers is monitored continually as they are simultaneously trained and used. Classifier tab 320 may further include an accuracy graph 326 and/or a loss graph 328. Accuracy graph 326 and loss graph 328 may display current and continually updated data reflecting the training status of the classifiers so the user can observe and evaluate the quality of the classifier. Graph 326 and 328 may continually adjust as the continued training of the classifiers changes the current accuracy and loss. As the classifiers are in use as training continues, graphs 326 and 328 provide the user with context in which to understand the reliability of the results in view the classifiers evolving quality. Graphs 326 and 328 may adjust is real-time with training progressions.

Figure 10A:
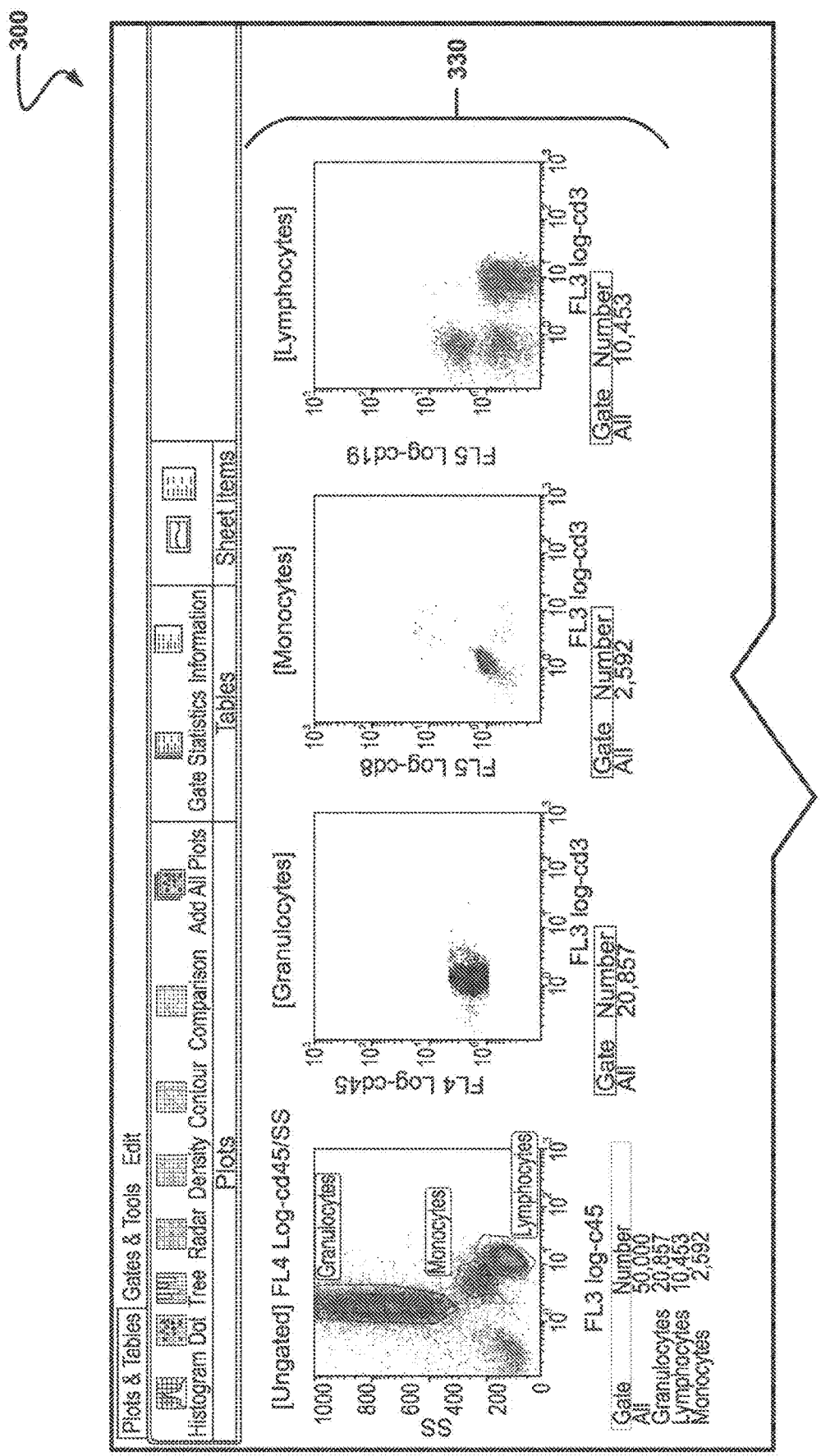
FIG. 10 (including FIGS. 10A and 10B) illustrates an example time lapse view of the training process presented in the GUI of FIG. 4 according to aspects of the present disclosure.
Figure 10B:
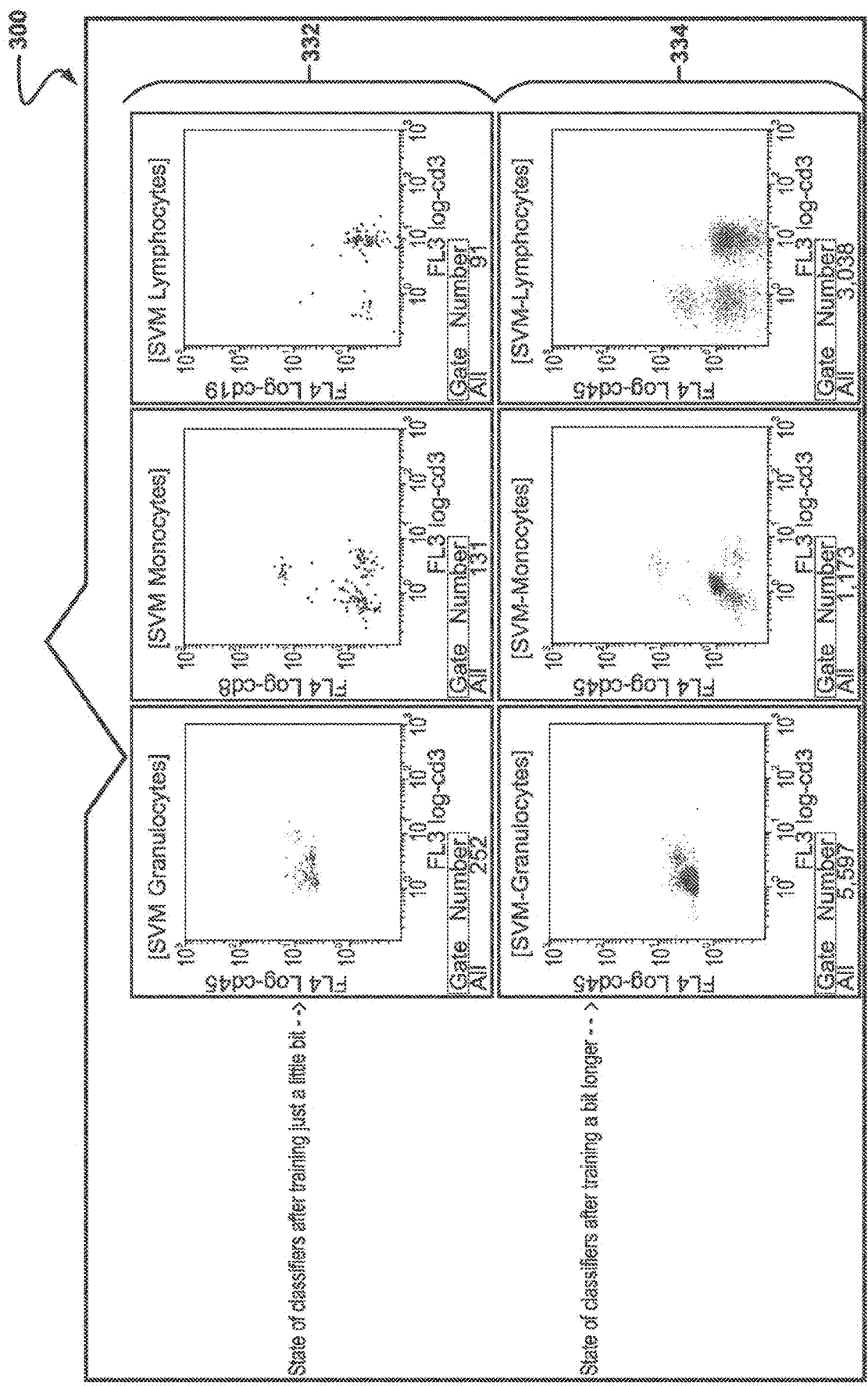

FIG. 10 (including FIGS. 10A and 10B) illustrates an example time lapse view of the training process presented in GUI 300 according to aspects of the present disclosure. A first row 330 shows the results of the manual gating, such as the gates received from a user. First row 330 represents the ground truth provided by a user. The subsequent rows show how the contents of the classifiers change over time as training continues. A second row 332 shows the contents of the gates generated using the classifiers during the initial application to a subject dataset. A third row 334 shows how the contents of the classifier gates after an additional period of time of training has occurred. Third row 334 therefore can demonstrate how the classifiers has progressed from their initial classifications shown in second row 332. Third row 334 may demonstrate changes in the output results as the classifying changes in response to the continued concurrent training of the classifiers.

At operation 418, a determination is made whether adjustments to the models should be made. The determination may be made based on the monitoring of classifier performance, at operation 416. The determination may be made by a user according to, for example, accuracy graph 326, loss graph 328, time lapse view showing how the classifiers are progressing such as views in row 332 and 334 of FIG. 10. The determination may be made by the system, such as based on a comparison the current output of the classifiers to a manual gating or ground truth.

If the determination is made that one or more of the model should be adjusted, the adjustments may be made, at operation 420. Adjustments may include, as some non-limiting examples, moving the gates in training data, manual moving output gates, adding statistics, or adding or changing a compensation of a model. For example, it may be determined that gate should be moved and, consequently, a determination of a movement to be applied to the gate is determined. The movement may be determined for and applied to a gate output by a classifier or a training gate. The movement may be applied automatically in response to the determination or may be presented to a user to be manually applied. After adjustments are made, another determination is made whether the model should be further adjusted, at operation 418.

Once a determination is reached that the models should not be further adjusted, a determination is made whether training has ended, at operation 422. If the determination is made that training has not been completed, the performance of the classifiers continues to be monitored, at operation 416. If the determination is made that the training has been completed, the method 400 may end, at operation 424.

Training stops when, for example, an accuracy threshold is reached or when a configured number of training epochs is achieved.

Figure 11:
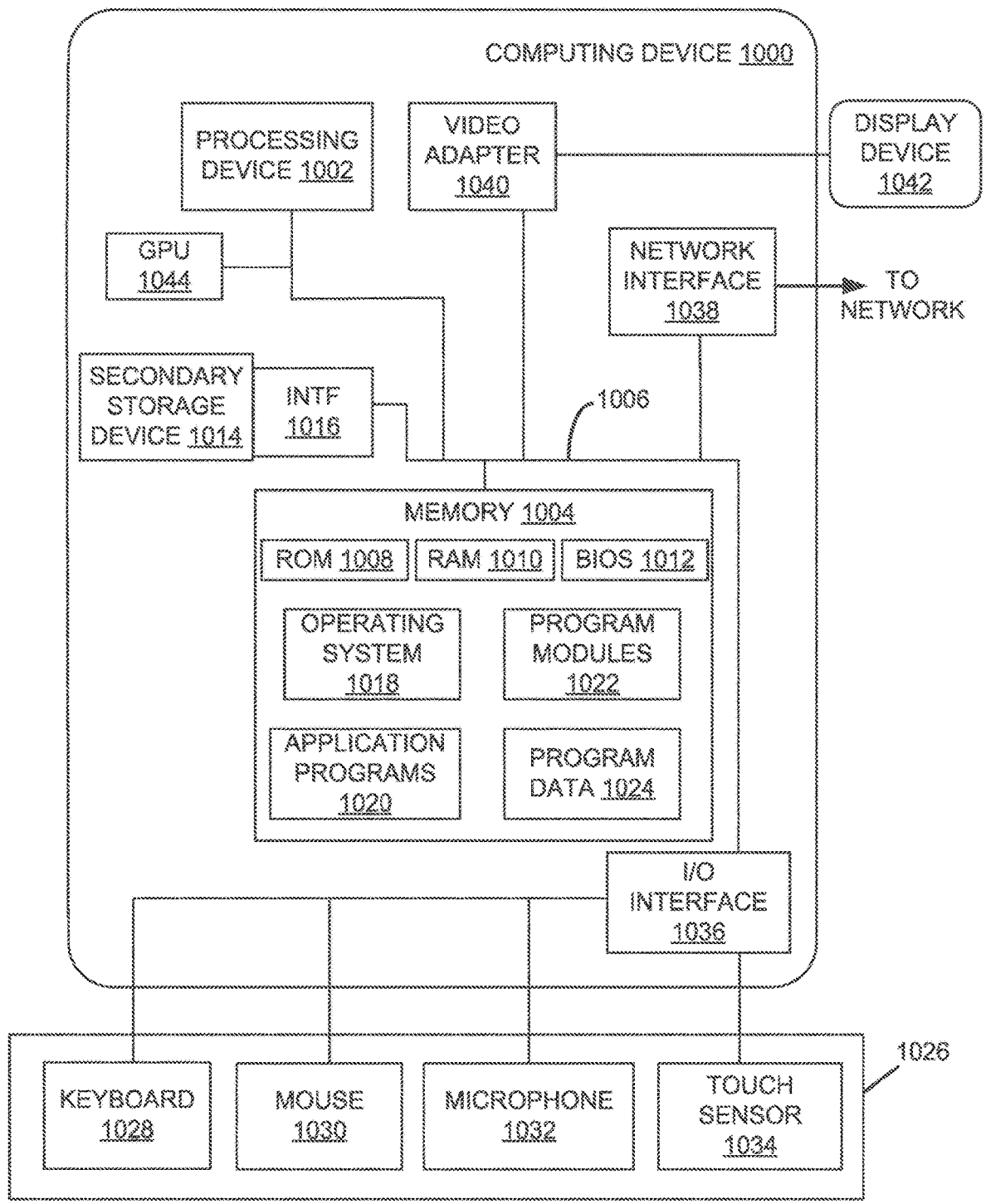
FIG. 11 illustrates an exemplary architecture of a computing device that can be used to implement aspects of the present disclosure.

FIG. 11 illustrates an exemplary architecture of a computing device 1000 that can be used to implement aspects of the present disclosure, including the classification and analysis device 150. The computing device illustrated in FIG. 11 can be used to execute the operating system, application programs, and software modules (including the software engines) described herein.

The computing device 1000 includes at least one processing device 1002, such as a central processing unit (CPU). In this example, the computing device 1000 also includes a system memory 1004, and a system bus 1006 that couples various system components including the system memory 1004 to the at least one processing device 1002. The system bus 1006 is one of any number of types of bus structures including a memory bus, or memory controller; a peripheral bus; and a local bus using any of a variety of bus architectures.

The system memory 1004 includes read only memory (ROM) 1008 and random-access memory (RAM) 1010. A basic input/output system 1012 containing the basic routines that act to transfer information within computing device 1000, such as during start up, is typically stored in the read only memory 1008. In some examples, the system memory 1004 has a large memory capacity, such as equal to or greater than one Terabyte of RAM. The RAM can be used to load and subsequently analyze the waveform data (e.g., the raw waveform data, such as stored in a raw waveform data file, which can include digitalized waveform data).

The computing device 1000 also includes a secondary storage device 1014 in some embodiments, such as a hard disk drive, for storing digital data. The secondary storage device 1014 is connected to the system bus 1006 by a secondary storage interface 1016. In some examples, the secondary storage devices 1014 and their associated computer readable media provide nonvolatile storage of computer readable instructions (including application programs and program modules), data structures, and other data for the computing device 1000.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

Several program modules can be stored in secondary storage device 1014 or system memory 1004, including an operating system 1018, one or more application programs 1020, other program modules 1022 (e.g., software engines described herein), and program data 1024. The computing device 1000 can utilize any suitable operating system, such as Microsoft Windows™, Google Chrome™, Apple OS, and any other operating system suitable for a computing device.

In some examples, a user provides inputs to the computing device 1000 through one or more input devices 1026. Examples of input devices 1026 include a keyboard 1028, mouse 1030, microphone 1032, and touch sensor 1034 (such as a touchpad or touch sensitive display). Additional examples include additional types of input devices 1026, or fewer types of input devices 1026. The input devices 1026 are connected to the at least one processing device 1002 through an input/output interface 1036 coupled to the system bus 1006. The input/output interface 1036 can include any number of input/output interfaces, such as a parallel port, serial port, game port, or a universal serial bus. Wireless coupling between input devices 1026 and the input/output interface 1036 is possible as well, such as through infrared, BLUETOOTH®, 802.11a/b/g/n, cellular, or other radio frequency communication systems in some possible embodiments.

GPU 1044 can be used to process GPU commands received from, for example, processing device 1002 and produce video output, such as a video stream. The GPU 1044 can be a video card or an integrated graphics chip, among others. In this example embodiment, a display device 1042, such as a monitor, liquid crystal display device, projector, or touch sensitive display device, is also connected to the system bus 1006 via a video adapter 1040. In addition to the display device 1042, the computing device 1000 can include various other peripheral devices (not shown), such as speakers or a printer.

When used in a local area networking environment or a wide area networking environment (such as the Internet), the computing device 1000 is typically connected to a network such as through a network interface 1038, such as an Ethernet interface. Other possible embodiments use other communication devices. For example, some embodiments of the computing device 1000 include a modem for communicating across the network.

The computing device 1000 typically includes at least some form of computer readable media. Computer readable media includes any available media that can be accessed by the computing device 1000. By way of example, computer readable media include computer readable storage media and computer readable communication media.

Computer readable storage media includes volatile and nonvolatile, removable, and non-removable media implemented in any device configured to store information such as computer readable instructions, data structures, program modules or other data. Computer readable storage media includes, but is not limited to, random access memory, read only memory, electrically erasable programmable read only memory, flash memory, compact disc read only memory, digital versatile disks or other optical storage, magnetic cassettes, magnetic tape, magnetic disk storage or other magnetic storage devices, or any other medium that can be used to store the desired information and that can be accessed by the computing device. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device 1000 is also an example of programmable electronics, which may include one or more such computing devices, and when multiple computing devices are included, such computing devices can be coupled together with a suitable data communication network to collectively perform the various functions, methods, or operations disclosed herein.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method of asynchronous training for classification of cellular subsets for flow cytometry, the method comprising:
   identifying a training file for training a classifier;
   receiving a gate associated with the training file for training the classifier;
   receiving a model for training the classifier;
   training the classifier using the training file, the gate, and the model, and, concurrent with training of the classifier:
   classifying one or more flow cytometry files;
   displaying a result of classifying of the one or more flow cytometry files, wherein the result comprises a gate graphic;
   monitoring an accuracy of the classifier; and
   making a determination whether the gate graphic should be adjusted based on the accuracy of the classifier, such that when the determination is that the gate graphic should be adjusted, the result displayed is adjusted in real-time with the determination; and
   determining training of the classifier is complete.

2. The method of claim 1, further comprising the result showing changes as the classifying of the one or more flow cytometry files changes in response to the training of the classifier continuing.

3. The method of claim 1, wherein the determination whether the gate should be moved based on the accuracy comprises determining a movement that should be applied to the gate.

4. The method of claim 3, further comprising moving the gate in response to determining the movement that should be applied to the gate.

5. The method of claim 1, further comprising making a determination to train an additional classifier.

6. The method of claim 5, wherein the determination to train the additional classifier is in response to receiving a selection of the additional classifier.

7. The method of claim 5, further comprising training the additional classifier.

8. The method of claim 1, further comprising making a determination that one or more statistics should be added to the model.

9. The method of claim 1, further comprising making a determination that a compensation of the model should be changed.

10. The method of claim 1, wherein the training file comprises a set of Flow Cytometry Standard (FCS) files.

11. The method of claim 1, wherein the gate selection is a geometric gate.

12. The method of claim 11, wherein the gate selection is a two-dimensional gate.

13. The method of claim 12, wherein the classifier infers one or more additional dimensions beyond the two-dimensional gate.

14. The method of claim 11, wherein the classifier generates a function based on the geometric gate.

15. The method of claim 1, wherein the result comprises a plurality of gate graphics.

16. The method of claim 15, wherein the result further comprises a detail plot for one or more of the plurality of gate graphics.

* * * * *